US009352702B2

(12) United States Patent
Leo

(10) Patent No.: US 9,352,702 B2
(45) Date of Patent: May 31, 2016

(54) SNOW BRUSH HOLDER ATTACHABLE TO THE EXTERIOR OF A VEHICLE

(71) Applicant: Brian Leo, Barrie (CA)

(72) Inventor: Brian Leo, Barrie (CA)

(*) Notice: Subject to any disclaimer, the term of this patent is extended or adjusted under 35 U.S.C. 154(b) by 0 days.

(21) Appl. No.: 14/306,642

(22) Filed: Jun. 17, 2014

(65) Prior Publication Data

US 2015/0360620 A1    Dec. 17, 2015

(51) Int. Cl.
*B60R 11/06* (2006.01)
*B60R 9/06* (2006.01)
*B60R 11/00* (2006.01)

(52) U.S. Cl.
CPC . *B60R 11/06* (2013.01); *B60R 9/06* (2013.01); *B60R 2011/004* (2013.01)

(58) Field of Classification Search
CPC ...... B60R 9/06; B60R 11/06; B60R 2011/004
USPC ................. 224/489, 501, 522–523, 529, 533, 224/536–537, 545, 555–556, 558, 560–561, 224/571; 248/222.13, 229.11, 229.21, 248/228.2, 230.2, 231.31, 316.2
See application file for complete search history.

(56) References Cited

U.S. PATENT DOCUMENTS

| 1,779,051 | A | * | 10/1930 | Shirley et al. | 248/539 |
| 2,322,798 | A | * | 6/1943 | Fischer | 248/476 |
| 2,431,400 | A | * | 11/1947 | Iverson | 224/515 |
| 2,914,285 | A | * | 11/1959 | Audette | 248/475.1 |
| 3,229,316 | A | * | 1/1966 | Matheson | 15/105 |
| 3,278,965 | A | * | 10/1966 | Frazier | 15/184 |
| 4,697,975 | A | * | 10/1987 | Lippold | 414/462 |
| 4,747,175 | A | * | 5/1988 | Durgin | 15/105 |
| 4,795,067 | A | * | 1/1989 | Hamilton | 224/543 |
| 4,871,205 | A | * | 10/1989 | Bray | B60R 13/04 293/128 |
| 6,036,070 | A | * | 3/2000 | Gauthier et al. | 224/527 |
| 6,044,563 | A | | 4/2000 | Stallman | |
| 2002/0166191 | A1 | * | 11/2002 | Josdal | 15/236.06 |
| 2009/0294498 | A1 | * | 12/2009 | Landgraf et al. | 224/493 |
| 2013/0097793 | A1 | | 4/2013 | Henningsen | |

FOREIGN PATENT DOCUMENTS

CA     2290108 A1 *  5/2001

* cited by examiner

*Primary Examiner* — Justin Larson
*Assistant Examiner* — Scott McNurlen
(74) *Attorney, Agent, or Firm* — Nasser Ashgriz; UIPatent Inc.

(57) ABSTRACT

The present invention is a snow brush container having a body attached externally to a vehicle to hold a snow brush, wherein the container having a means to be mounted to the vehicle. The container being attached to the part of the vehicle that has a gap between two parts in the body which allow an L-shaped hook of the container pass through the gap.

4 Claims, 7 Drawing Sheets

SNOW BRUSH HOLDER ATTACHABLE TO THE EXTERIOR OF A VEHICLE

FIELD OF THE INVENTION

The present invention relates to a snowbrush holder which attaches to the exterior of a vehicle.

BACKGROUND OF THE INVENTION

In winter periods and in snowy locations, vehicles may be covered by snow if left outside. It is, therefore, necessary to clear the vehicle from snow before driving. A snow brush is a common tool to clear snow from a vehicle. Therefore, most drivers keep a snow brush in their vehicle for this purpose. To get the snow brush from the interior of a vehicle, a driver has to open the vehicles door or trunk. In a snow covered vehicle, as soon as the vehicle door or trunk is opened, the snow that is on the surface may get into the vehicle, making the seats and the interior of the vehicle wet. The present device is invented to prevent such occurrences. By installing a snow brush on the exterior of a vehicle, there is no need to open vehicle doors or its trunk to reach the snow brush. The car can be cleared of snow before any door is opened. The present invention relates to a portable snow brush holder that clamps or clips to the outside of a vehicle. None of the prior art have a proper method of securely attaching a snow brush holder to the exterior of a vehicle.

SUMMARY OF THE INVENTION

The present invention relates to a container to hold a snow brush outside of a vehicle. Reaching a snow brush inside the vehicle passenger compartment is difficult when a massive amount of snow piles on top of the vehicle. A driver may prefer to have some items like a snow brush or an ice scraper outside of the passenger compartment.

The snow brush holder is mounted on the outside so as to provide easy and convenient access to the snow brush. It eliminates the need to open the door of the vehicle or any interior part such as a trunk, door or any other such vehicle part. The brush can be accessed without requiring any interior parts of the vehicle to be opened. The present invention eliminates any risk of snow getting inside the vehicle when accessing such interior parts.

The location of the snow brush holder on the vehicle body also serves as a confinement location for placing the snow brush. A user does not have to search or locate keys prior to using the snow brush and can clear the snow in a shorter amount of time.

In this case, there should be a container to be attached to the outside of the vehicle (body of the vehicle) to hold the items. The attachment means of the container to the vehicle can be varied based on the model of the vehicle and different configuration of the body of the vehicle.

The way that the container is attached to the body of the vehicle can be different with different attachment means. It is important that the attachment means do not harm the body of the vehicle.

The snow brush holder may preferably be mounted anywhere on the exterior of the vehicle which has a lip or edge. For instance, at the edges of the doors, trunk, fenders or bumpers.

Other objects, features, and advantages of the present invention will be readily appreciated from the following description. The description makes reference to the accompanying drawings, which are provided for illustration of the preferred embodiment. However, such embodiments do not represent the full scope of the invention.

BRIEF DESCRIPTION OF THE DRAWINGS

Embodiments herein will be described in conjunction with the appended drawings provided to illustrate and not to limit the scope of the claims, wherein like designations denote like elements, and in which:

DETAILED DESCRIPTION OF THE DRAWINGS

Figure 1:
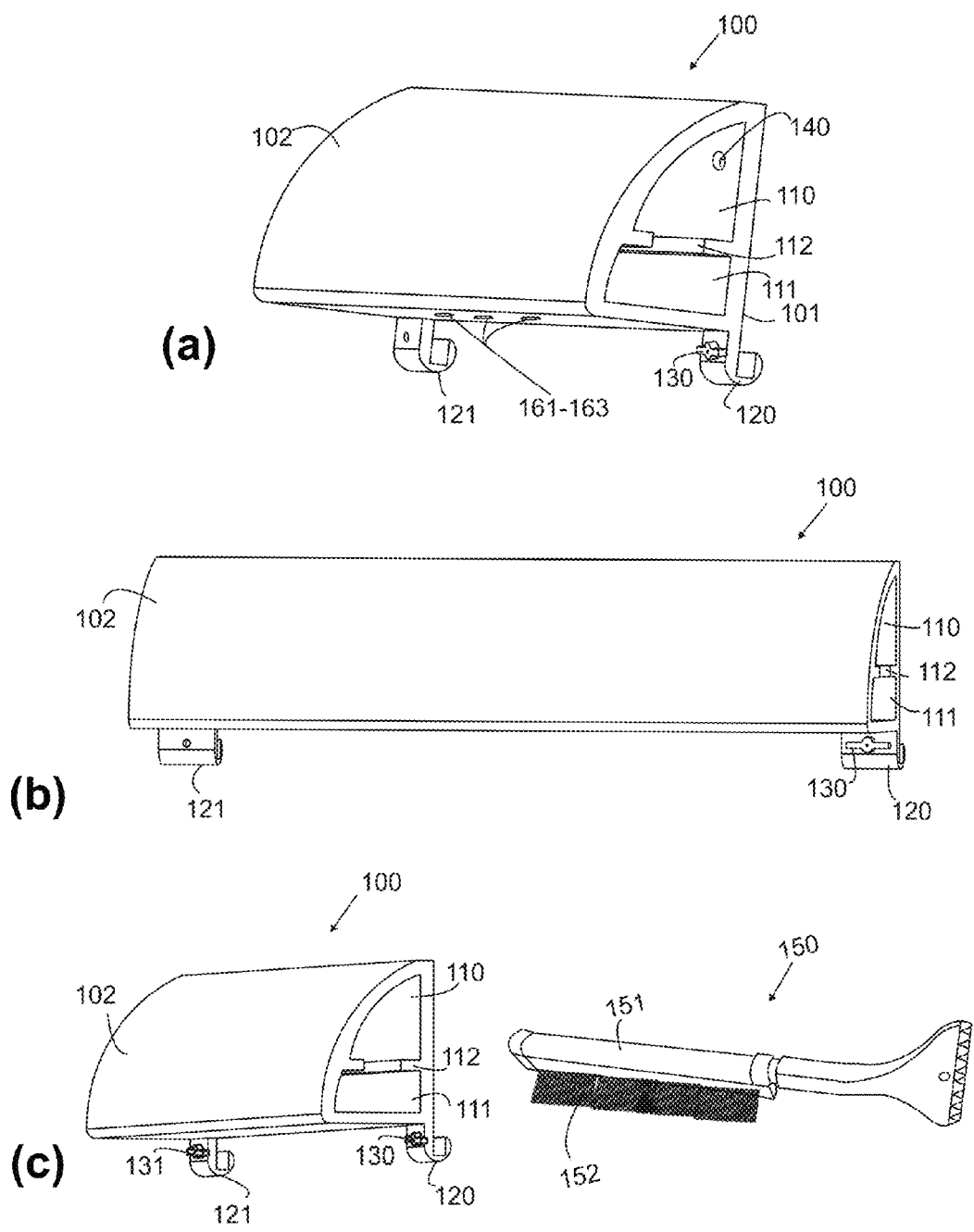
FIG. 1 shows an isometric and front view of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

FIG. 1 (a-b) respectively show an isometric and front view of the present invention. The present invention consists of a body 100 with two hooks 120-121 at its bottom end. The posterior side 101 of the body 100 is flat and the anterior side 102 is curved. The curved side 102 prevents snow to collect on the top of the body 100 and makes it more aerodynamic so as to reduce noise while the vehicle is moving. In one embodiment of the present device, the interior of the body 100 is divided in two chambers 110-111. The chambers are separated by a divider bar 112. The hooks 120-5 121 are L shaped to allow them to go around the lip of the trunk of a vehicle. Pair of thumbscrews 130-131 are installed on the hooks 120-121. The top chamber 110 can also have an opening 140 for the insertion of a rivet or similar object for placement against a vehicle trunk.

A brush 150 can easily be inserted into the body 100 of the present invention, as shown in FIG. 1(c). A brush 150 enters the body 100 from one end. The bristles 152 are aligned to enter the top chamber 110 while the brush handle portion 151 enters the bottom chamber 111. The divider bar 112 holds the brush 150 in place and prevents it from falling. The divider 112 can also be used to remove any excess snow from the bristles 152 as they enter the brush holder body 100. The gap between the divider bars 112 can range from preferably ¼ to 5 inches to accommodate a wide range of snow brushes. The height of divider bar 112 can also be adjusted to allow for varying heights of snow brushes 150 to be used. The brush 150 can be any kind of snow brush with different attachments such as an ice scraper, and also being a telescopic snow brush to manage the part of the length of the brush that goes inside the snow brush holder. There is plurality of holes 161-163 at the bottom of the body 100 to work as drain holes allowing water to come out from the body 100.

Figure 2:
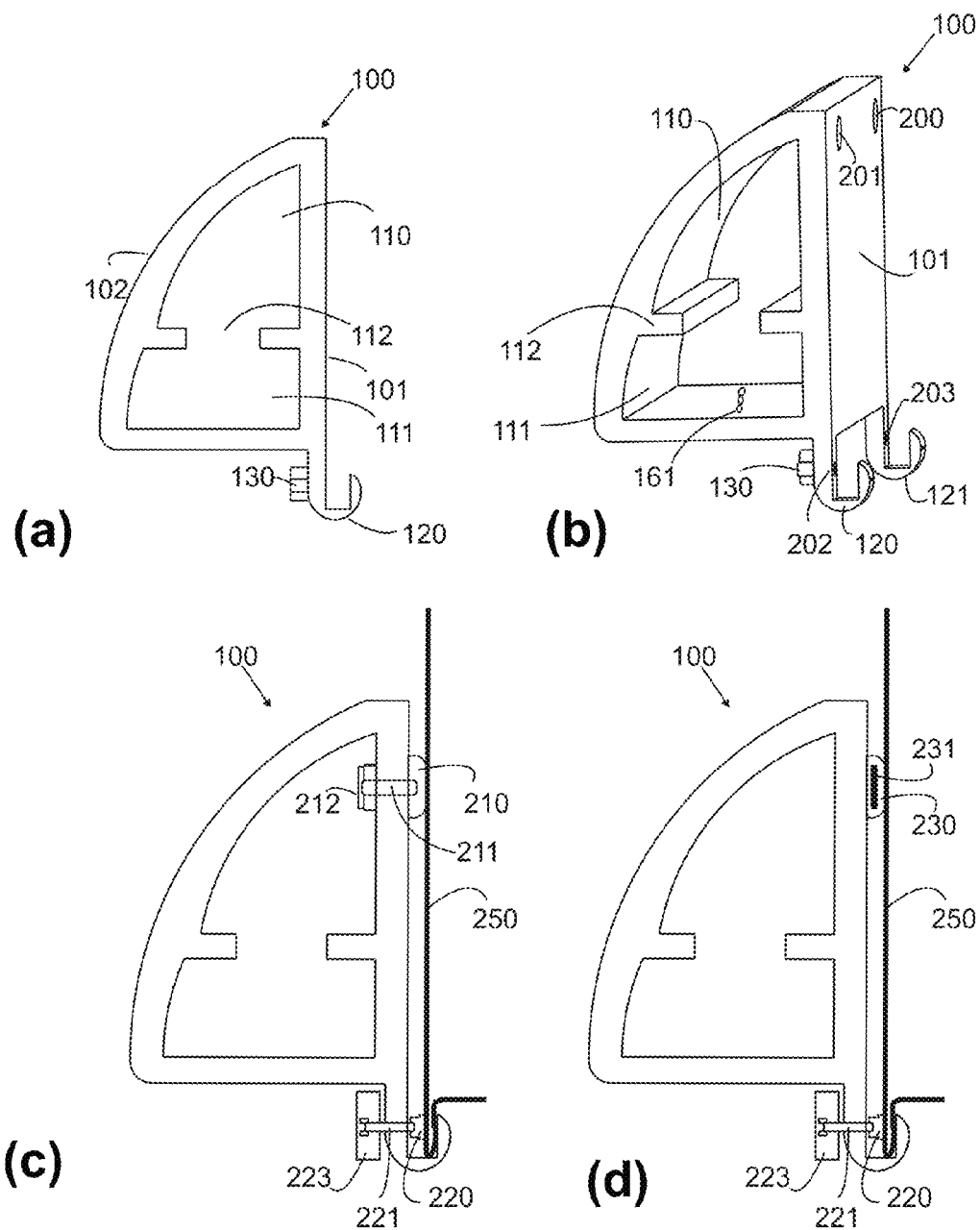
FIG. 2 is a cross-sectional view of the present invention.

A cross-section of the present invention is shown in FIG. 2 (a-d). As described above, the snow brush holder of the present invention consists of a body 100 that is clamped on to the trunk of the vehicle. In some embodiments the body 100 may have two chambers. The top chamber 110 being made for the brush bristles 152 and the second 111 for the brush handle 151. The narrow gap 112 separating the two chambers allows for the brush to be rested and held upright when inserted. As shown in FIG. 2b, some embodiments may have screw holes 200-203 which are located on the posterior end 101 and on the hooks 120-121. The top screw holes 200-201 are located on the posterior end 101 of the body 100 directly opposite of the top chamber 110. A second set of screw holes 202-203 are located on the hooks 120-121. The screw holes 200-203 serve to allow for insertion of fastening means of the body 100 of the present invention to a vehicle.

FIGS. 2 (c) and 2 (d) show the attachment means of the body 100 of the present invention to a vehicle trunk 250. One embodiment of attachment means show in FIG. 2 (c), consists of a rubber pad or rubber grommet 210 attached to a rivet 211 at one end. The rivet 211 is then attached to a retaining spring 212 at the other end. Other embodiments as shown in FIG. 2 (d) may simply consist of a rubber 230, or similar material, pad glued or otherwise attached only to the posterior end 101 of the present invention. In another embodiment of the present invention, there is a small magnet 231 inside a rubber 230 to help the body 100 remain attached to the vehicle trunk 250.

In FIGS. 2 (c) and 2 (d) it is shown that the bottom screw is comprised of a thumbscrew 223 at one end. A swivel head screw 221 that is attached to the thumbscrew 223 at one end and a rubber pad 220 on the other end. The rubber pad 220 contains an insert in which the swivel head screw 221 is inserted and tightened. The rubber pads 220 and grommets/magnets 210 serve to attach the snow brush holder 100 to the vehicle trunk 250 with sufficient pressure but without damaging the exterior of the vehicle.

Figure 3:
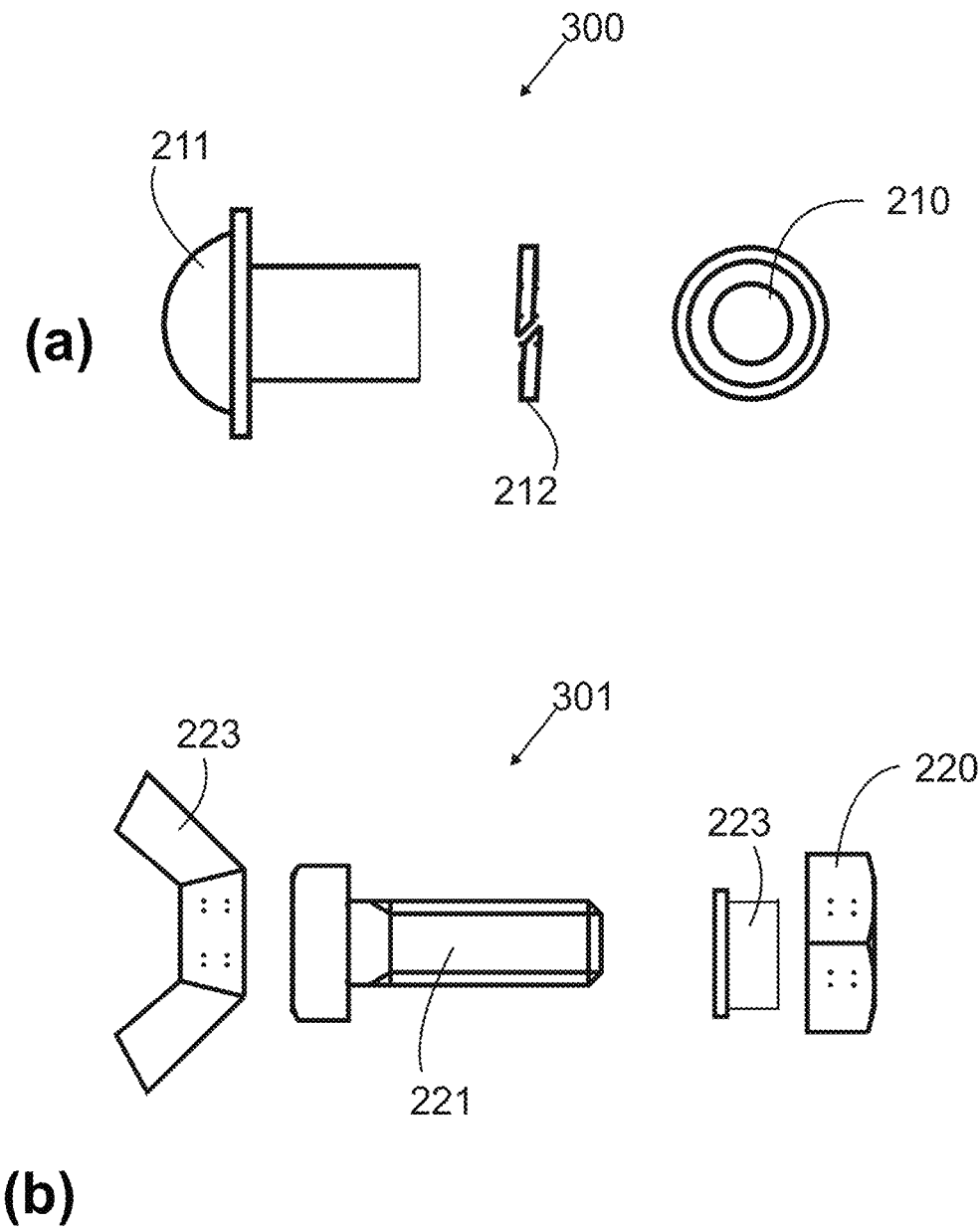
FIG. 3 shows the fastening means and an exploded view of the top and bottom fastening means.

FIG. 3 (a-b) show the fastening means and an exploded view of the top and bottom fastening means. The top fastening means may be comprised of a rivet 211 attached to a stainless steel spring 212 at one end and a rubber grommet or pad 210 at the other end. The bottom fastening means 301 can be comprised of a thumb screw 223 which is attached to a swivel head screw 221. The swivel head screw 221 then screws into an insert 223 that is places inside a rubber pad or grommet 220. The pads 220 and grommets 210 can also be made of other non-abrasive material that does not scratch the surface of the vehicle.

Figure 4:
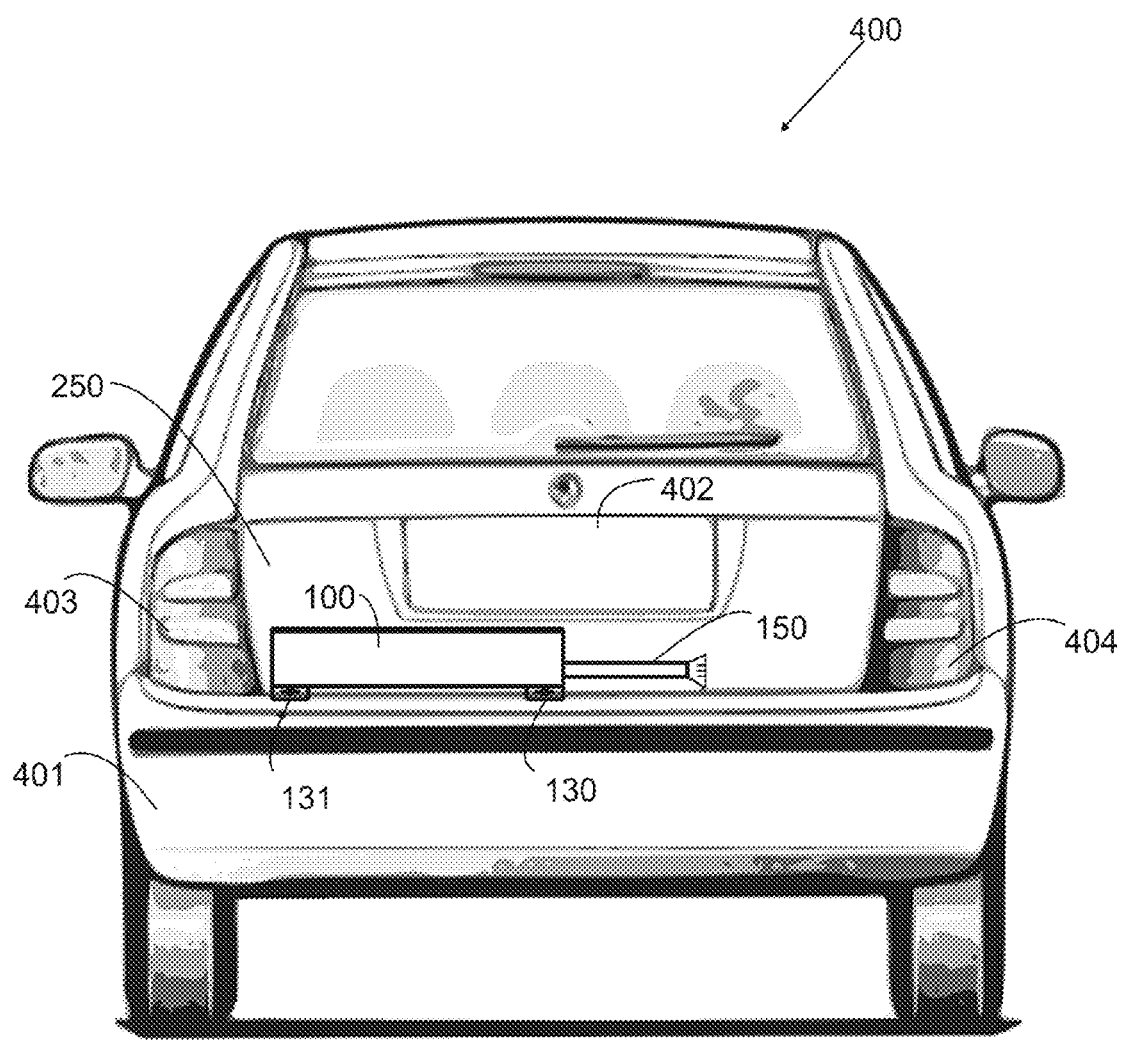
FIG. 4 shows the snow brush holder attached to a vehicle.

The present invention is shown attached to a vehicle 400 in FIG. 4. The body 100 of the present invention is attached to the bottom portion of the vehicle trunk 250. The dimensions of the present invention are intended not to obscure the licence plate 402 nor the vehicle lights 403-404. The present invention is also placed away from the vehicle bumper 401 so as to not interfere with its function. The present invention is fastened fixedly on the lower portion of the trunk 250 near the bumper 401. The two screws 130-131 on the bottom serve to fixedly mount the brush holder 100 and adjust the position of the snow brush holder 100. Placement of the snow brush holder 100 on the outside of the vehicle 400 allows for easier access to the snow brush 150.

Another embodiment of the present invention is to attach the snow brush to a bumper of the vehicle. In some vehicles the bumper has a specific configuration that allows a snow brush to be attached to the vehicle by the means that are herein described. There is a possibility to install and attach said snow brush to a lower door edge of a vehicle, as long as there is a small gap between the two parts of the vehicle that allow two hooks of the snow brush place in the gap, the snow brush can install in the gap spaces.

Figure 5:
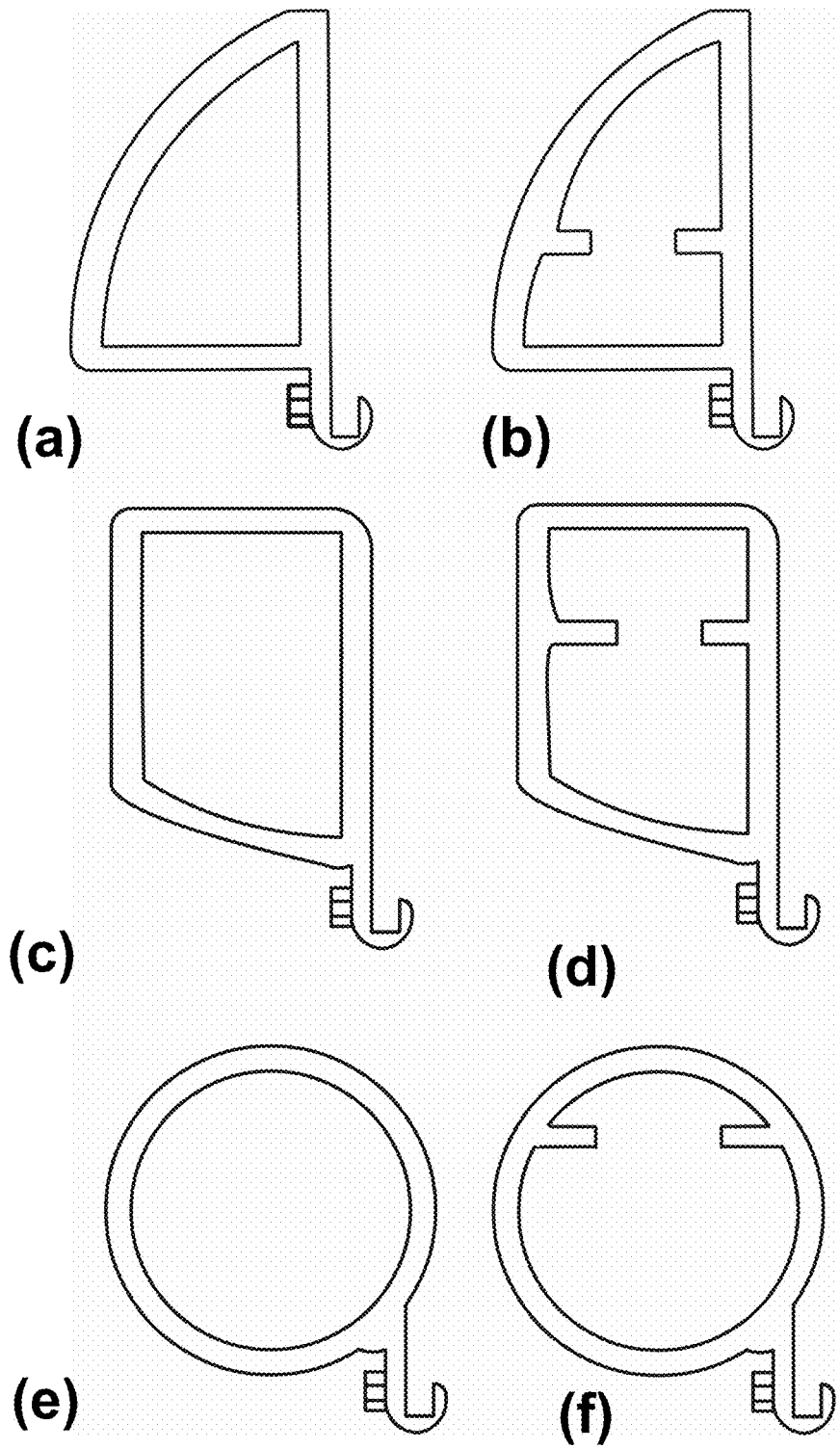
FIG. 5 shows various embodiments of the body of the present invention.

FIG. 5 shows various embodiments of the present invention. The separator 112 can be present, as shown in FIGS. 5 (b), 5 (d), and 5 (f), or absent, as shown in FIGS. 5 (a), 5 (c), and 5 (e), in the embodiments. The shape of body 100 of the present invention may be roughly triangular, as shown in FIGS. 5 (a-b), roughly rectangular shape, as shown in FIGS. 5 (c-d), and roughly circular shape, as shown in FIGS. 5 (e-f).

Figure 6:
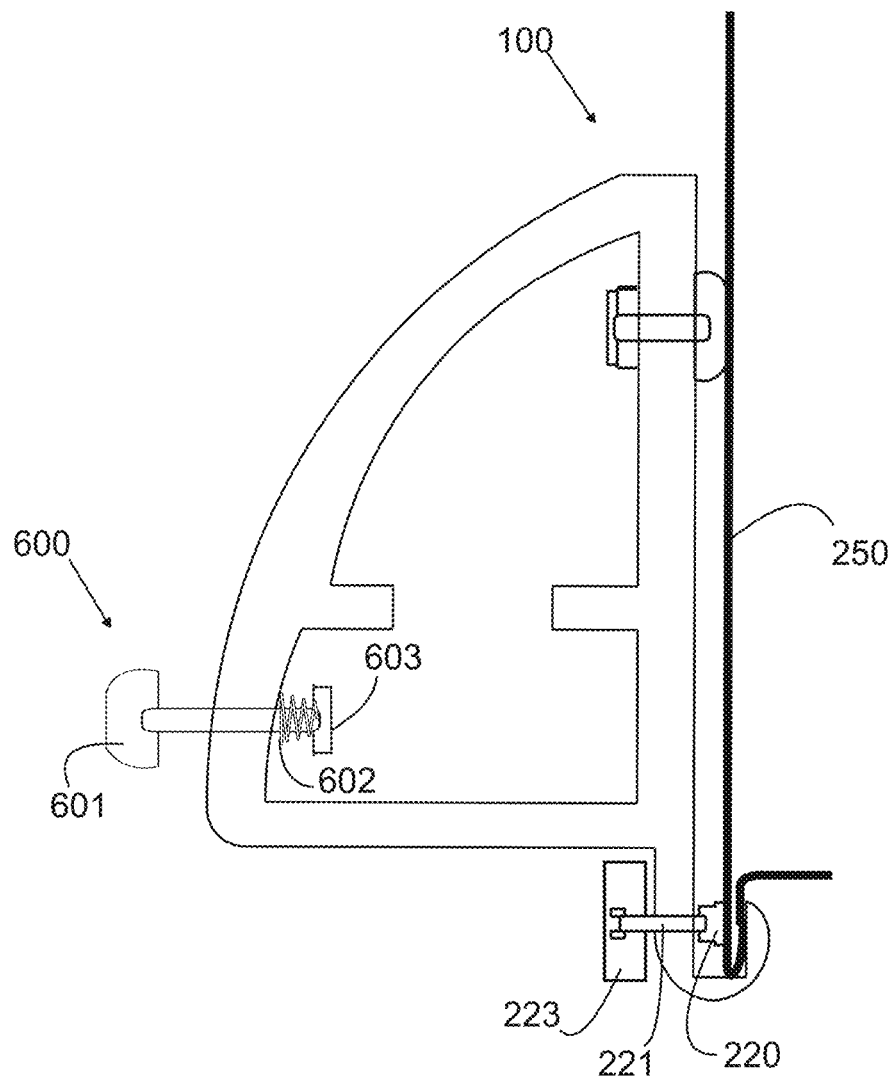
FIG. 6 shows a locking/retaining/securing mechanism for the snow brush holder.

Other embodiments of the present invention may also include a locking/securing mechanism 600 as shown in FIG. 6. A locking mechanism 600 comprised of a screw 601, a spring 602 and a wall 603 can be used to lock the brush 150 in place. Pressing down on the screw 601 forces the wall 603 toward the posterior end 101 and pushes and fixes the snow brush handle 151 against the wall 603 and the wall of the top chamber 110. Using this means the snow brush 150 can be fixedly mounted to the snow brush holder 100 and be prevented from falling while the vehicle 400 is in motion. Likewise a lock and key can also be added to the locking mechanism 600 to secure the snow brush 150 against theft. An electronic remote releasing mechanism can be added to a securing device to release a snow brush.

Figure 7:
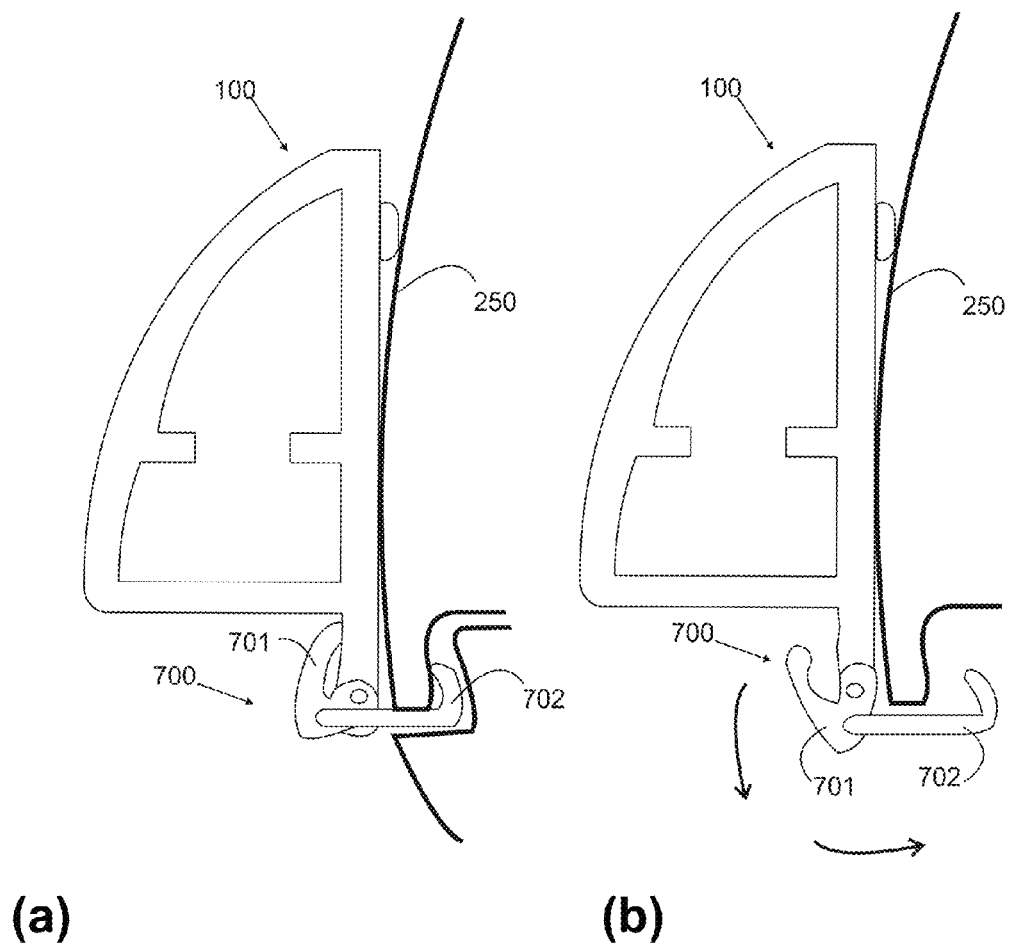
FIG. 7 shows another embodiment of the present invention having an over center latch.

Another embodiments of the present invention may also include an over center latch 700 as shown in FIG. 7. In some cases thumb screws may be replaced with over center latches. Over center latches will allow for quicker mounting and dismounting while retaining the ability to resist removal unless the trunk lid or door is unlocked. The over center latches may be kept in place by their own spring tension or could have a locking tab or ring for attaching a lock. The over center latches will be constructed, coated, or plated to resist corrosion from the environment.

The over center latch 700 as shown in FIG. 7 comprises of a handle 701 and a hook arm 702. Wherein the hook arm 702 being engaged with the body of the vehicle 250 and pivotally connected to the handle 701. FIG. 7 (a) shows the snow brush holder in a closed position and FIG. 7 (b) shows the snow brush holder in an open position.

The snow brush holder of the present invention can only be removed from the body of the vehicle by opening of the trunk or doors of the vehicle, such a mounting mechanism prevents it from being stolen.

The snow brush holder and snow brush can be made from different kind of materials such as a metal alloy or a plastic material or combination of the metal with the plastic materials.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A snow brush holder attachable to the exterior body of a vehicle to hold a snow brush, wherein said snow brush has an elongated bristle head, said snow brush holder comprising:
   a. an elongated body having a front surface, a back surface, a top surface, a bottom surface, an open distal end, and an open proximal end, wherein said surfaces forming an interior space;
   b. said front and top surfaces being aerodynamically curved to prevent snow from collecting on the holder and to reduce wind generated noise while the vehicle is in motion;
   c. ;
   d. a plurality of hooks extending from the bottom surface of said holder to attach said holder onto the body of the vehicle;
   e. said interior space shaped to receive said brush head and having means to securely hold a snow brush handle;
   f. said means to securely hold the snow brush handle comprising:
      a. a pair of elongated bars projected into the interior space from said proximal end to said distal end
      b. a specific gap between said bars sized to fit said bristles;
   g. a plurality of drain holes at the bottom surface to drain melted snow from the elongated body; and
   h. a locking means to lock said snow brush in said holder by a contact surface equipped with a spring to push said brush head toward said back surface,
   whereby the snow brush is inserted into said holder from the open proximal or distal ends and is secured with the securing means, and whereby, the open ends and the drain holes prevent snow accumulation inside the holder.

2. The snow brush holder of claim 1, wherein each said hook comprising of:
   a. an L-shaped part having a longer length and a shorter length, wherein said longer length being extended from said bottom surface of the holder, and wherein said shorter length having a catching edge to secure said holder to the vehicle body; and
   b. a set of screws having an insert and a rubber pad, whereby said rubber pad being pushed onto an edge of the vehicle body toward the catching edge of the L-shaped part.

3. The snow brush holder of claim 1, further having a top fastening means attached to an upper part of the back surface, wherein said top fastening means is selected from the group consisting of:
   a. a rubber pad being connected to said holder by a rivet;
   b. a rubber pad glued to the back surface of said holder; and
   c. a rubber pad having a magnetic part.

4. The snow brush holder of claim 1, further having an over center latch, said over center latch comprises of a handle and a hook arm, wherein the hook arm being engaged with the body of the vehicle and pivotally connected to the handle.

* * * * *